United States Patent [19]

Iyama et al.

[11] 3,843,248
[45] Oct. 22, 1974

[54] EXPOSURE TIME CONTROL DEVICE FOR USE IN CAMERAS

[75] Inventors: Sadaomi Iyama; Yasuo Uchida, both of Tokyo, Japan

[73] Assignee: Konishiroku Photo Industry Co., Ltd., Tokyo, Japan

[22] Filed: Feb. 26, 1973

[21] Appl. No.: 335,924

[30] Foreign Application Priority Data
Mar. 1, 1972  Japan.............................. 47-20569

[52] U.S. Cl..................... 354/32, 354/39, 354/57, 354/149, 354/273, 354/289
[51] Int. Cl...... G03b 7/02, G03b 7/16, G03b 17/20
[58] Field of Search............... 95/10 C, 44 R, 64 A; 354/23, 32, 39, 42, 53, 57, 59, 149, 271, 273, 289

[56] References Cited
UNITED STATES PATENTS

| | | | |
|---|---|---|---|
| 3,212,418 | 10/1965 | Kuppenbender et al............ | 95/10 C |
| 3,344,723 | 10/1967 | Rentschler.......................... | 95/10 C |
| 3,443,496 | 5/1969 | Sauer et al.......................... | 95/64 A |
| 3,457,844 | 7/1969 | Kitai ................................... | 95/64 A X |
| 3,492,928 | 2/1970 | Kitai ................................... | 95/64 A X |
| 3,537,375 | 11/1970 | Kiper ................................... | 95/10 C X |

*Primary Examiner*—Joseph F. Peters, Jr.
*Attorney, Agent, or Firm*—Bierman & Bierman

[57] ABSTRACT

An improved camera is disclosed, which comprises an automatic exposure control mechanism, a flashmatic mechanism for controlling a diaphragm in flash-photography, a first member, for indicating a diaphragm aperture value in association with the flashmatic mechanism, and a means for detachably mounting a flash device on the camera, the first indicating member being adapted to move in response to shutter speed adjustment of the automatic exposure control mechanism, the second indicating member being adapted to be observed when the flash device is mounted on the mounting means.

3 Claims, 5 Drawing Figures

EXPOSURE TIME CONTROL DEVICE FOR USE IN CAMERAS

This invention relates to a device which provides the correct exposure time by applying auxiliary light to an object to be photographed when the main source of light (e.g., daylight) is behind the object. This is known as counter light photography.

Heretofore, when the subject stands at a window in strong sunlight, it has very often been found (especially if the camera has an automatic exposure device) that the exposure is adjusted in response to the sunlight entering through the window behind the subject. Hence, the correct exposure with respect to the subject can not be obtained. One of the prior art approaches used to obtain the correct exposure in this situation is to utilize a flash bulb as the auxiliary light to illuminate the side of the subject facing the camera lens. This is difficult even for those well experienced in counter-light photography. Hence, it is recognized that adjustment for obtaining a correct exposure is a critical point in the counter-light photographing techniques.

Accordingly, it is an object of this invention to provide a device capable of effecting correct adjustment of exposure to thereby obtain a correct value of exposure even in counterlight photography. The provision of the device is such that an electronic flash with guide numbers to adjust for differences in light output of various flashbulbs is attached to the camera so as to interconnect the focusing means with the diaphragm. The size of the aperture is determined by the diaphragm control mechanism based upon the distance from the film to the object to be photographed. This value is indicated in a view finder or on a portion of the camera body. The exposure meter is controlled by the actuation of an exposure time control means, until the indication of the exposure meter governed by the brightness of external light comes to coincide with the indication given by said focusing means. Finally, the release member is actuated. Since the electronic flash has an extremely short flash duration (i.e. 2m. sec.) exposure by electronic flash light is unaffected by usual exposure times. Accordingly, alteration of exposure time does not affect the exposure by the electronic flash. As a result, a correct exposure with respect to both the external light and the electronic flash is obtained.

In the attached drawings.

Figure 1:
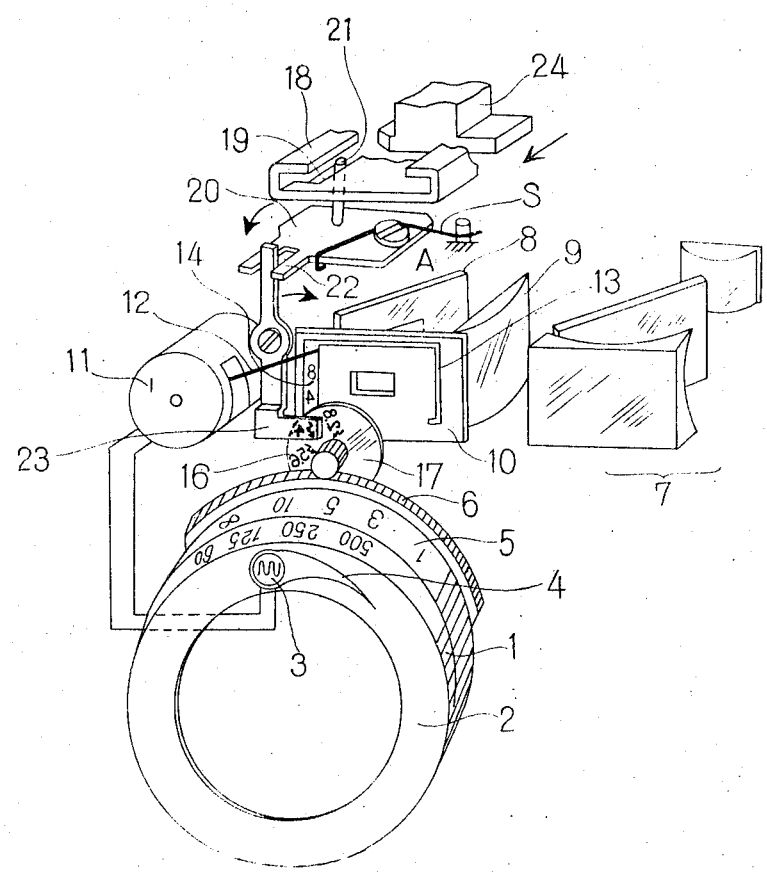
FIG. 1 is a perspective view showing the essential part of the device according to one embodiment of the invention.

Referring more particularly to FIG. 1, there is provided an exposure time control ring 1 constituting part of a lens barrel and having a front wall portion 2 with a tear drop-shaped control aperture 4 adapted to adjust the amount of light entering a light receiving element 3 provided in control ring 1. A focusing ring 5 is rotatably mounted contiguously to control ring 1, said focusing ring 5 having a sector gear 6 provided on the outer circumference thereof. Shown at 7 is a view finder and there is provided a target plate 10 having a bright frame, from which the light rays enter said finder through a reflector 8 and a lens 9. A pointer 12 of the exposure meter 11 controlled by the light receiving element 3 extends into frame 13. On the left portion of the frame 13 are figures 14 indicating aperture values, so that pointer 12 can indicate an aperture value. Further, plate 10 has a window 15, through which an aperture value indication plate 17 is partially observed. This aperture value indication plate 17 is transparent has thereon figures 16 expressing aperture values and is interconnected with the sector gear 6 of focusing ring 5. Designated at 18 is a shoe mounted on a camera body A and provided with a slot 19. An actuating plate 20 is rotatably pivoted on the camera body A, said actuating plate 20 being adapted to be urged by a spring S in one direction and having a pin 21 connected thereon and adapted to engage slot 19. Said actuating plate 20 has a forked portion 22 with a lever 23. Said lever 23 extends downwardly so that its free end is front of the indication window 15 with the aperture value indication plate 17 interposed therebetween so as to cut off the light passing through the transparent plate 17 and the window 15.

Shown at 24 is an inserted leg member of the auxiliary lighting device which is fitted in shoe 18.

Figure 2:
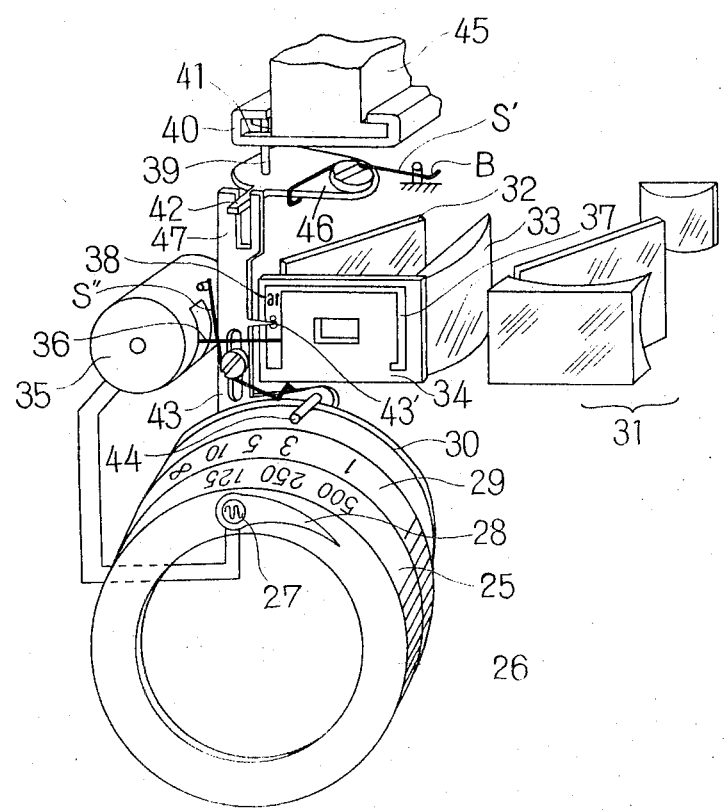
FIG. 2 is a perspective view showing the essential part of the device according to another embodiment.

Referring to FIG. 2, an exposure time control ring 25, constituting part of a lens barrel, has a front wall portion 26 provided with a tear-drop shaped control aperture 28 controlling the amount of light entering a light receiving element 27. A rotatable focusing ring 29 is contiguous to exposure time control ring 25, and has a cam 30 disposed at the outer circumference thereof. Shown at 31 is a view finder, and there is provided an opaque plate 34 having a bright frame 37. The light rays coming through frame 37 enter the viewfinder through a reflector 32 and a lens 33. A pointer 36 of an exposure meter 35 is controlled by the light receiving element 27 and extends into the frame 37, so as to indicate the aperture values 38 provided on said frame 37. An actuating plate 46 is rotatably pivoted on a camera body B, actuating plate 46 being urged by a spring S' in one direction and having a pin 39 extending upwardly to engage a slot 41 provided at a shoe 40 on the attached camera body B. Said actuating plate 46 has a projection 42 engaging a forked portion 47 of an aperture value indication lever 43. Lever 43 is vertically movable, rotatably mounted on the camera body, and resiliently held by a spring S'. Lever 43 has a projection 43' (for indicating aperture value 38) and a pin 44 provided at a lower arm and engaging the cam 30 of the focusing ring 29. Designated at 45 is an inserted leg member fitted in the shoe 40.

Figure 5:
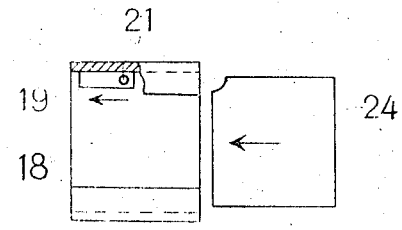
FIG. 5 is a front view showing the fitting of a 5 leg member of the auxiliary light device in a shoe.

The device is operated as follows:

Referring to the embodiment of FIG. 1, when the object to be photographed stands between the camera and the counterlight, the leg member 24 is fitted in the shoe 18 which is on the camera body A. By the insertion of leg member 24, the pin 21 is urged by the corner portion of leg member 24 along the slot 19 in the direction of the arrow, as shown in FIG. 5. Consequently, the actuating plate 20 is caused to rotate in the counter-clockwise direction against the force of the spring S, whereupon the lever 23 is urged in the clockwise direction thereby to retract the free end thereof from the indication window 15. Thus the aperture value is observed in the view finder through the indication window 15. In this embodiment, the lever 23 is interconnected, by way of actuating plate 23, with the inserted leg member 24. It is clear that the interconnection between the lever and leg member can be provided by utilizing a cam mechanism or the like.

Figure 3:
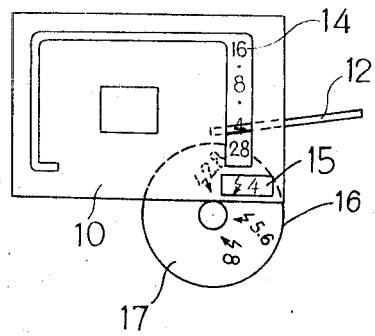
FIG. 3 is a front view of a view finder portion showing the method procedure of exposure adjustment in the embodiment of FIG. 1.

In the meantime, the focusing ring 5 interconnected with a diaphragm (not shown) by means of a known flashmatic mechanism that is the mechanism for automatically controlling the aperture in accordance with a distance value and a guide number of the flash device, is adjusted for the distance from the camera to the object to be photographed, while at the same time the aperture value indication plate 17 is turned by sector gear 6. Thus the value of aperture when just focused is displayed in the view finder through the indication window 15. The value of aperture at that time is now assumed to be F 4 as shown in FIG. 3. Then, the exposure time control ring 1 is rotated to select a shutter speed. The amount of light entering the light receiving element is adjusted with the aid of the tear drop-shaped control aperture 4; thus the pointer 12 of the exposure meter is shifted. When pointer 12 indicates that the value of the aperture 14 on the frame of light coincides with the value of the aperture shown in the indication window 15, exposure time control ring 1 is stopped. Thus, all the adjustment procedures are completed This includes the adjustment for the amount of natural light against the counter-light which enters the light receiving element and the adjustment for obtaining a correct exposure when the auxiliary light is applied to the object to be photographed. Finally, a release member is pushed so as to apply the auxiliary light to the object and snap the shutter thereby taking the picture.

In the device of FIG. 2, like FIG. 1, the inserted leg member 45 of the auxiliary light device is fitted in the shoe 40 fixed on the camera body B, and the pin 39 is urged by the corner portion of said member 45 along the slot 41. As a consequence, the actuating plate 46 is caused to rotate in the counterclockwise direction against the force of the spring S', such that the projection 42 of said plate 46 causes the aperture value indication lever 43 to rotate in the clockwise direction. Thereby the pin 44 of said lever 43 is brought into contact with the cam 30, and another projection 43 appears on the frame 37 of the plate 34. The focusing ring 29 is rotated in cooperation with a diaphragm (not shown) by means of the flashmatic mechanism, so as to adjust for the distance from the film to the object to be photographed. At the same time, the cam 30 is actuated to cause the pin 44, to shift vertically, whereupon the aperture value indication lever 43 is moved vertically. Hence, the projection 43' is shifted vertically along the frame 37 which has the figures expressing aperture values 38 thereon. Thus, the value of the aperture which coincides with the focusing value is indicated by the projection 43' in the view finder.

Figure 4:
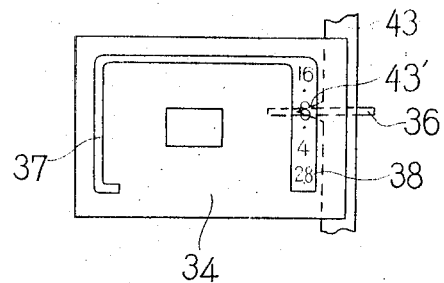
FIG. 4 is a front view of a view finder portion showing the method of exposure adjustment in the embodiment of FIG. 2.

The aperture value in this case is assumed to be F 8, as shown in FIG. 4. The time control ring 25 is turned so as to adjust, with the aid of the tear drop-shaped control aperture 28, the amount of light entering the light receiving element. The pointer 36 of the exposure meter 35 is thereby caused to shift. When pointer 36 is brought into alignment with the projection 43' as shown in FIG. 4, the time control ring 25 is stopped. At this point, adjustments for the amount of natural light against the counter-light and the proper exposure value when the auxiliary light is applied to the object to be photographed, are completed. Finally, the release lever is pushed so as to apply the auxiliary light, snap the shutter and take the picture.

According to this invention, the distance from the camera to the object to be photographed is adjusted by the flashmatic mechanism and the value of aperture according to the distance of the object is automatically determined. The value of aperture thus determined is displayed in the view finder. The exposure time and in turn the amount of light entering the light receiving element are adjusted for by the exposure time control device. The adjustment of the amount of entering light is continued until the pointer indicate that the value of the aperture shown in the view finder coincides with the value of the aperture determined by said focusing device. Thus, in counter-light photography, not only is the amount of counter-light properly adjusted for, but also the exposure time is adjusted for the application of the auxiliary light. With the arrangement of this invention, a correct value of exposure in counter-light photography using auxiliary light can be obtained simply by adjusting the incoming light so that the pointer coincides with the value of aperture. This eliminates the need for any special skills in this photographing technique.

What we claim is:

1. A camera comprising an automatic exposure control mechanism, a flashmatic mechanism for controlling a diaphragm in accordance with focus adjustment in flash-photography, a first member for indicating a diaphragm aperture value in association with the automatic exposure control mechanism, a second member for indicating a diaphragm aperture value in association with the flashmatic mechanism, and a means for detachably mounting a flash device on said camera, said first indicating member being adapted to move in response to shutter speed adjustment of the automatic exposure control mechanism, said second indicating member being adapted to be observed when the flash device is mounted on the mounting means.

2. A camera according to claim 1, wherein both said first member and said second member are adapted to be observed in a view finder.

3. A camera according to claim 2, wherein said flashmatic mechanism is adapted to operate automatically when the flash device is mounted on the mounting means.

* * * * *